C. E. BARRIE.
CORN HUSKING MACHINE.
APPLICATION FILED SEPT. 1, 1910.
1,019,586.
Patented Mar. 5, 1912.
3 SHEETS—SHEET 1.
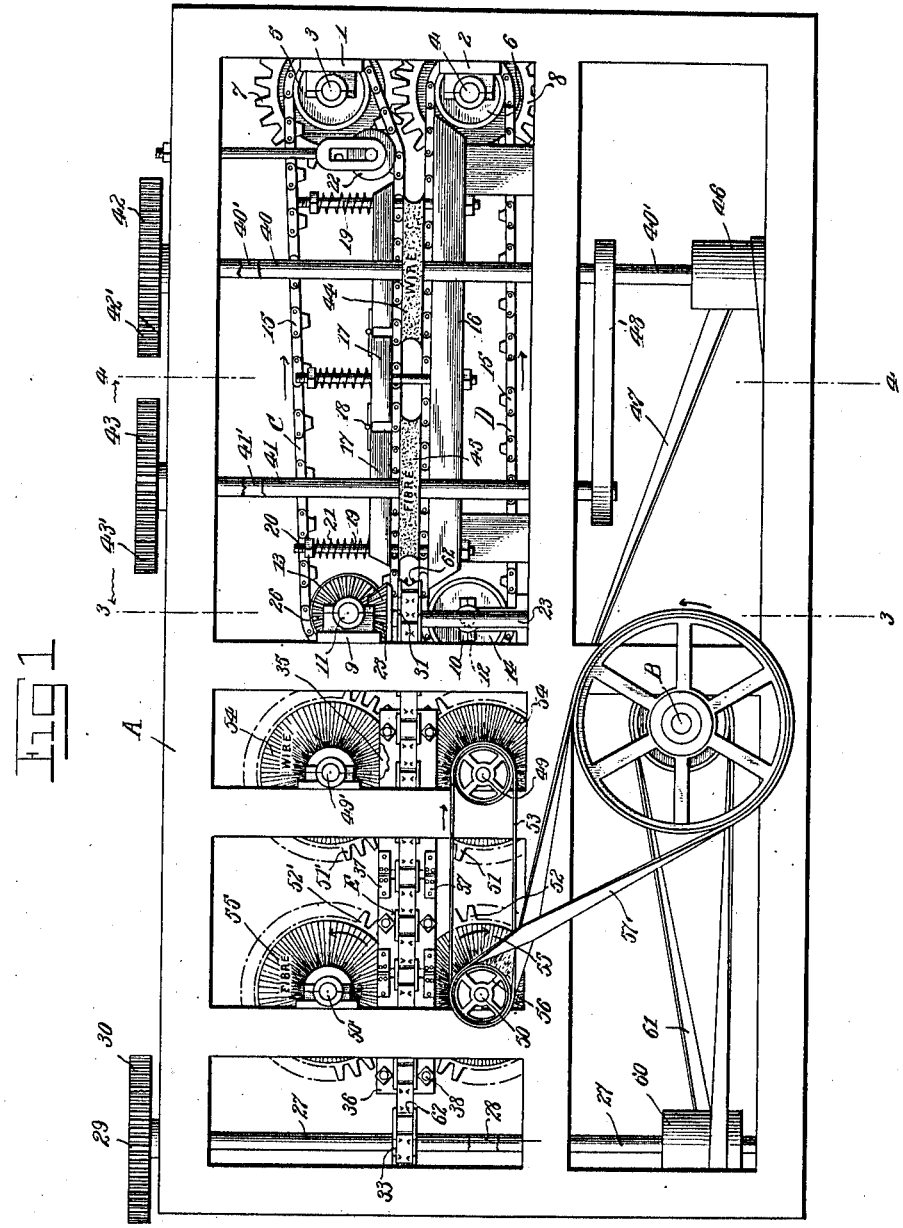
Witnesses
J. H. Crawford
Wm Bagger
Inventor
Charles E. Barrie,
By Victor J. Evans
Attorney

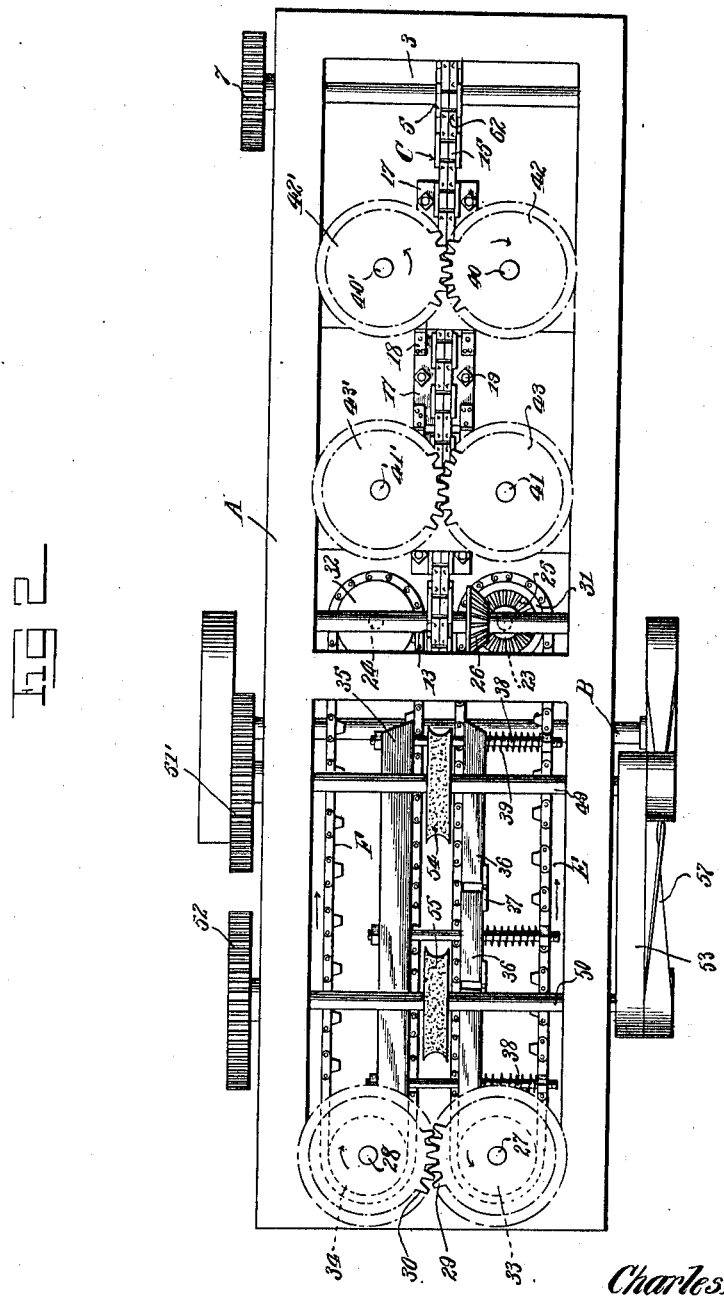

C. E. BARRIE.
CORN HUSKING MACHINE.
APPLICATION FILED SEPT. 1, 1910.
1,019,586.
Patented Mar. 5, 1912.
3 SHEETS—SHEET 3.
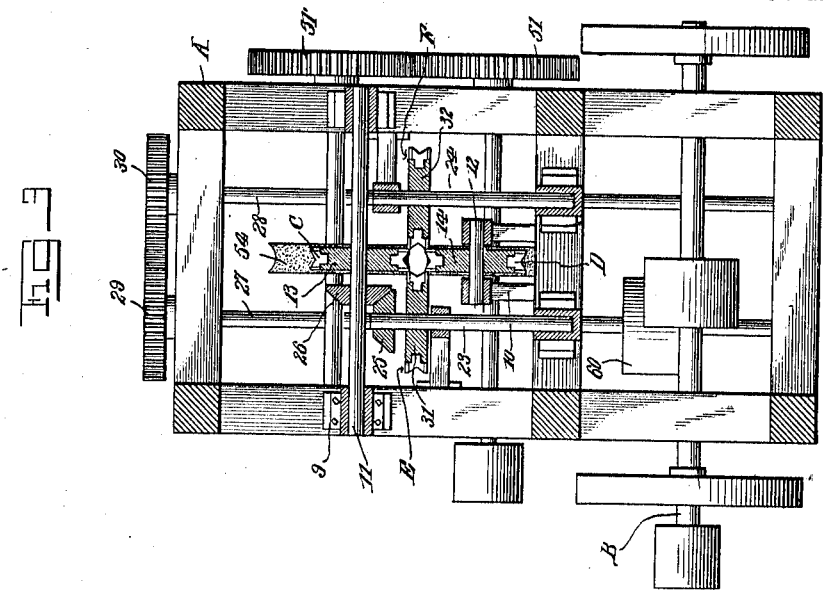
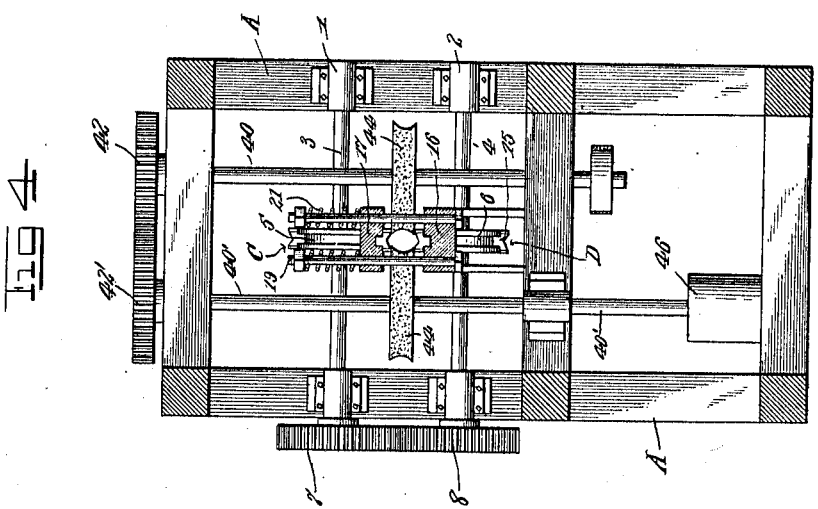
Witnesses
J. C. Crawford
Wm Bagger
Inventor
Charles E. Barrie
By Victor J. Evans
Attorney

UNITED STATES PATENT OFFICE.

CHARLES E. BARRIE, OF BRATTLEBORO, VERMONT.

CORN-HUSKING MACHINE.

1,019,586. Specification of Letters Patent. Patented Mar. 5, 1912.

Application filed September 1, 1910. Serial No. 579,975.

*To all whom it may concern:*

Be it known that I, CHARLES E. BARRIE, a citizen of the United States of America, residing at Brattleboro, in the county of Windham and State of Vermont, have invented new and useful Improvements in Corn-Husking Machines, of which the following is a specification.

This invention relates to corn husking machines and particularly to that class of corn huskers in which the ears of corn are moved by endless carriers in such a manner as to be operated upon by husk stripping devices which are supported for rotation.

The present invention has for one of its objects to produce a machine of the class referred to in which the ears of corn shall be seized successively by a plurality of carriers disposed at various angles, thus exposing in succession all the sides or faces of the corn to the action of the stripping and cleaning elements.

Further objects of the invention are to simplify and improve the general construction and operation of a machine of the class referred to.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a corn husking machine constructed in accordance with the invention with parts broken away. Fig. 2 is a top plan view of the same with parts broken away. Fig. 3 is a vertical transverse view taken on the plane indicated by the line 3—3 in Fig. 1. Fig. 4 is a transverse sectional view taken on the plane indicated by the line 4—4 in Fig. 1.

Corresponding parts in the several figures are denoted by like characters of reference.

The frame A of the improved corn husking machine is provided intermediate the ends thereof with bearings for the main shaft B which may be driven in any convenient manner from any suitable source of power.

The frame of the improved machine is provided adjacent to its front end with bearings or boxes 1, 2 in which shafts 3, 4 are supported for rotation. The shafts 3 and 4, the former of which is disposed above the latter, are provided with chain wheels 5, 6 and with intermeshing spur wheels 7, 8. At a suitable distance from the front end of the frame are bearings 9, 10 in which shafts 11, 12 are supported for rotation, said shafts being in parallel relation to each other and to the shafts 3, 4 at the front end of the frame. The shafts 11, 12 carry chain wheels 13, 14. Endless carrier chains C and D are trained, respectively, over the chain wheels 5 and 13 of the upper shafts 3 and 11 and over the chain wheels 6 and 14 of the lower shafts 4 and 12. These chains are made up of links 15 having transversely cupped faces presenting longitudinal V-shaped grooves so that the cupped faces of a plurality of links constituting one lead of the chain will combine to form an elongated gutter adapted for engagement with an ear of corn lengthwise of the latter. The opposed faces of the mating chains will combine to constitute a carrier adapted to seize ears of corn and to carry them lengthwise along from the front in the direction of the rear end of the machine. A supporting table or platform 16 is arranged beneath the upper lead of the lower carrier chain D which will thus be firmly supported and prevented from sagging at points intermediate the wheels over which it is trained. The lower lead of the upper chain is flexibly and yieldingly supported by means of a table made up of a plurality of leaves 17 which are connected together by means of hinges 18 enabling said leaves to flex or to yield independently under upward pressure upon the lower lead of the carrier chain C. The leaves 17 are supported by means of rods 19 depending from cross bars 20 in such a manner that the said leaves may slide or move upwardly upon the rods against the tension of springs 21 which are coiled about said rods. The leaves 17 are to be so constructed as to afford no obstruction to the movement of the carrier chain C, and the latter will be forced under the tension of the springs 21 operating against the leaves 16 in the direction of the opposed face of the mating carrier chain D.

It will be observed that the shafts 3 and 4 adjacent to the front or receiving end of the frame are spaced wider apart than the shafts 11 and 12. It follows that the chain wheels 5, 6 carried by said shafts which are of the same dimensions as the chain wheels 13 and 14, will be spaced wider apart than the said wheels 13, 14, thus spacing the receiving ends of the carrier chains wider apart than the rear ends of said chains. This is obviously desirable in order to enable ears of corn to be conveniently fed between the carrier chains, but in order to enable the ears to be quickly gripped and seized upon by the carrier chains, an idler or chain tightener 22 is provided, said tightener being adapted to bear against the lower lead of the carrier chain C directly in rear of the chain wheel 5, said tightener being so adjusted that the major part of the opposed faces of the carrier chains will be normally held in approximately parallel relation. This tightener may be regarded as an adjunct to the pressure table composed of the leaves 17, and it serves also to avoid undue friction upon the front portion of said table.

Supported for rotation in suitable bearings, adjacent to the shaft 12 and at right angles to the latter are vertical shafts 23, 24, the former of which carries a bevel gear 25 intermeshing with a bevel gear 26 upon the shaft 11. The frame of the machine is provided near its rear end with bearings for two shafts 27, 28 provided with intermeshing spur wheels 29, 30. The shafts 23, 24 are provided with chain wheels 31, 32, and the shafts 27, 28 are provided with chain wheels 33, 34. Carrier chains E and F are guided, respectively, over the chain wheels 31, 33 and 32, 34, said chains being of a construction similar to that of the chains C, D, combining with each other to constitute a carrier of the same description as that formed by the chains C, D; said carriers being disposed in planes at right angles to each other or approximately so. The carriers formed by the chains C, D and E, F are, moreover, so juxtaposed that an ear of corn leaving the carrier formed by the chains C, D will be delivered into the carrier formed by the chains E, F, whereby it will be conveyed to the rear end of the machine. The inner lead of the carrier chain F is supported by means of a table or platform 35 which is suitably supported in the frame of the machine. The inner lead of the carrier chain E is supported by means of a table composed of a plurality of leaves 36 connected by hinges 37, said leaves being slidably supported upon rods 38 having springs 39, whereby the leaves 36 will be forced yieldably against the inner lead of the chain E, forcing the same in the direction of the mating lead of the chain F.

Supported for rotation in the frame of the machine adjacent to opposite sides of the carrier composed of the chains C, D are vertical shafts 40, 40' and 41, 41', said shafts 40, 40' being provided with intermeshing gears 42, 42' and said shafts 41, 41' being provided with intermeshing gears 43, 43'. The shafts 40, 40' are equipped with brushes 44 disposed intermediate the opposed inner leads of the carrier chains C, D, and having concave engaging faces, said brushes being manufactured of stiff wire. Similar brushes 45 are fixed upon the shafts 41, 41' intermediate the inner opposed leads of the carrier chains C, D, said brushes being, however, preferably made of hemp or similar fibrous material. The shafts 40, 40' are disposed relatively near, and the shafts 41, 41' relatively distant from the front end of the machine, so that ears of corn fed to the machine will be first acted upon by the wire brushes 44, and afterward by the fiber brushes 45. One of the shafts, 40', has a drive pulley 46 which is connected by a quarter twisted belt 47 with a pulley upon the main shaft, whereby it will be driven in the proper direction, thus transmitting motion through the gear wheels 42, 42' to the mating shaft 40, the brushes upon said shafts being driven reversely to the feed movement of the chain. A chain or link belt 48 serves to transmit motion from the brush carrying shaft 40 to the brush carrying shaft 41 which drives its mate 41' by means of the gear wheels 43, 43'.

Pairs of brush carrying shafts 49, 49' and 50, 50' are supported for rotation adjacent to opposite sides of the carrier composed of the chains E, F, said brush carrying shafts being provided, respectively, with intermeshing gears 51, 51' and 52, 52', and one of the shafts, 49, being connected with the shaft 50 by a flexible chain or belt 53. The shafts 49, 49' carry wire brushes 54, and fiber brushes 55 are fixed upon the shafts 50, 50'. The shafts 50, 50' which carry the fiber brushes are disposed relatively near the tail end of the frame structure, and one of said shafts, 50, has a pulley 56 connected by a crossed belt with a pulley upon the main shaft B from which it derives motion.

The shaft 27 near the tail end of the machine which carries a chain wheel 33 supporting one end of the carrier chain E is equipped with a band pulley 60 which is connected by a quarter twisted belt 61 with a pulley upon the main driving shaft B from which it derives motion.

From the foregoing description, taken in connection with the drawings hereto annexed, the operation and advantages of this invention will be readily understood by those skilled in the art to which it appertains. The carriers composed, respectively, of the chains C, D and E, F may be driven at any requisite speed, and the concave faced links constituting said chains may be provided upon their inner faces with teeth or barbs, as shown at 62, which shall efficiently grip and tightly hold the ears of corn fed between the chains of the respective carriers. By said carriers the ears will be presented successively to the wire brushes 44 and the fiber brushes 45, which will strip the husks and the silk from opposite sides of each ear. The ear being thus partly stripped or husked will be delivered from the carrier composed of the chains C, D to that composed of the chains E, F and will by the latter carrier be exposed to the action successively of the wire brushes 54 and the fiber brushes 55, whereby the cleaning and stripping operation will be completed, the husked ear being eventually discharged at the tail end of the machine.

It is obvious that by properly proportioning the means whereby motion is transmitted to the various moving parts of the machine, any desired relative speed may be attained, no limitation in this respect being made unless to the effect that the relative speed which shall in practice be found most efficient will be employed.

Having thus described the invention, what is claimed as new, is:—

1. In a corn husking machine, an ear carrying device comprising two endless chains having opposed leads diverging at the receiving end and disposed in substantially parallel relation for the greater portion of their length, said chains having cupped links to engage diametrically opposite sides of an ear of corn, in combination with ear stripping means supported for rotation in planes approximately at right angles to the planes of movement of the endless carrying means, said stripping means being disposed to engage diametrically opposite sides of the ears of corn exposed between the carrying means.

2. In a corn husking device, gripping and carrying means comprising two endless chains having opposed leads moving in one direction, the greater portions of said leads being disposed in substantially parallel relation and diverging at their receiving ends, each link of each of said chains being provided with a longitudinal V-shaped groove which is provided with husk engaging teeth to engage diametrically opposite sides of ears of corn and to convey such ears positively in the direction of their length, in combination with husk stripping devices arranged in pairs adjacent to opposite sides of the carrier and operating between the opposed leads of the chains constituting such carrier to engage diametrically opposite sides of the ears exposed between the opposed leads of the chains.

3. In a corn husking machine, a plurality of sets of ear stripping devices supported for rotation and arranged in pairs adapted for simultaneous engagement with diametrically opposed sides of an ear of corn, some of said ear stripping devices being mounted for rotation in planes substantially at right angles to others of said ear stripping devices, in combination with means for positively conveying ears of corn lengthwise between said several sets of ear stripping devices, said conveying means consisting of endless chains arranged in pairs having opposed leads moving in the same direction, said chains being made up entirely of links having longitudinal grooves having husk engaging teeth, a plurality of such links combining to form a groove or gutter wherein the entire length of an ear of corn may be supported, the opposed leads of the chains combining to engage diametrically opposed sides of the corn ears.

4. In a corn husking machine, an ear carrying device comprising two endless chains having opposed leads converging from the front in a rearward direction, a guide wheel engaging one of the opposed leads and deflecting the same to place the greater portion of the opposed leads in substantially parallel relation, stationary supporting means for one of said opposed leads, spring actuated supporting means for the other lead, and ear stripping means supported for rotation in planes approximately at right angles to the planes of movement of the endless carrying means and adapted to engage diametrically opposite sides of the ears of corn exposed between the carrying means.

5. In a corn husking machine, an ear carrying device comprising two endless chains having opposed leads converging from the front in a rearward direction, a guide wheel engaging one of the opposed leads and deflecting the same to place the greater portion of the opposed leads in substantially parallel relation, stationary supporting means for one of said opposed leads, spring actuated supporting means for the other lead, said spring actuated supporting means comprising a plurality of hingedly connected leaves adapted to yield independently to pressure against the lead of the chain engaged thereby, and ear stripping means supported for rotation in planes approximately at right angles to the planes of movement of the endless carrying means and adapted to engage diametrically opposite sides of the ears of corn exposed between the carrying means.

In testimony whereof I affix my signature in presence of two witnesses.

CHARLES E. BARRIE.

Witnesses:
MERTON S. LAZELL,
CARL S. HOPKINS.

Copies of this patent may be obtained for five cents each, by addressing the "Commissioner of Patents, Washington, D. C."